Oct. 22, 1963 A. FONÓ 3,107,482
METHOD OF AND MEANS FOR CONVEYING GASEOUS
FLUIDS OVER LONG DISTANCES
Filed Nov. 13, 1961 3 Sheets-Sheet 1

ALBERT FONÓ
INVENTOR.

BY

AGENT

ALBERT FONÓ
INVENTOR.

ALBERT FONÓ
INVENTOR.

United States Patent Office 3,107,482
Patented Oct. 22, 1963

3,107,482
METHOD OF AND MEANS FOR CONVEYING GASEOUS FLUIDS OVER LONG DISTANCES
Albert Fonó, Budapest, Hungary, assignor to Komplex Nagyberendezesek Export Import Vallalata, Budapest, Hungary, a corporation of Hungary
Filed Nov. 13, 1961, Ser. No. 151,831
18 Claims. (Cl. 60—6)

My present invention relates to long-distance pipelines for combustible gases and has as its principal object the provision of a method, and of means for carrying such method into practice, of increasing the efficiency, reliability and economy of operation of such pipelines.

In conventional pipeline practice compressors provide a pressure rise just sufficient for the displacement energy required to deliver the conveyed fluid to the consumer at the required terminal pressure, with due allowance for fluctuations in demand. The system must be designed for maximum operating conditions and as a consequence, during a considerable portion of its operating time, is underutilized since it is operating below rated capacity.

Because conventional pipelines operate at a pressure determined by the transient demand, they provide little or no inherent storage capacity that can be called upon during temporary line shut-down.

It is a further object of my invention to enable a pipeline to be designed for mean fluid consumption rather than maximum consumption, thereby reducing the size and weight of the pipes and the cost of installation.

A more particular object of my invention is to improve the performance of a system in which the inherent higher efficiency of high-pressure fluid transportation is utilized for the dual purpose of recovering an excess of useful energy and making available a reserve of compressed fluid in the line to compensate for fluctuations in demand and to increase the reliability of the system by using the stored fluid to reduce or eliminate interruptions of supply otherwise necessitated by line defects, maintenance and repair.

A system of the type referred to includes a compressor at the beginning of the pipeline or a section thereof, in order to increase the pressure of the outgoing fluid to an optimum value, higher than that normally employed in such line, which will improve the efficiency of transmission while also enabling the line to supply expected short-time peak loads. At the terminus of the pipeline an expansion device such as a gas turbine or a piston-type engine recovers the energy originally used to increase the pressure at the input end and also a surplus of energy available because of the diminished pressure drop at higher pressure.

At the input end the compression of the gas should be carried out as nearly isothermally as possible since the heat gained by the fluid upon polytropic compression, unless usefully recovered, will be lost during transmission; thus, any convenient consumer of thermal energy (e.g. a thermodynamic or thermoelectric device) may be positioned in heat-exchanging relationship with the line section at or beyond the compressor at that end. This, however, is not essential since the amount of heat developed by compression will be relatively small. At the output end, similarly, the oncoming fluid should reach its expanded state at substantially the ambient temperature; this may be accomplished by a heating of the gas during expansion or, more conveniently, with preheating followed by polytropic or preferably adiabatic expansion. The heat required for this purpose can be obtained very economically, in the case of a pipeline for combustible fluids such as natural or coke-oven gas, by burning a small portion of the delivered fluid.

Generally, the (usually variable) pressure difference available at the output end, representing the recovered and surplus energy, may be applied to any suitable pressure-operated load, especially one which does not require the maintenance of a constant input pressure. This particularly includes systems wherein the pressure difference is converted first into kinetic and then into potential energy which is accumulated when available and used up when needed, a typical example being a pump delivering water to an elevated storage container. A preferred mode of utilization, because of its universal applicability, involves the conversion of the kinetic energy of a pressure-operated device into electrical energy, advantageously alternating current of constant voltage and frequency. This can be realized by coupling a gas turbine or other fluid-driven engine to a synchronous alternating-current generator coupled to an A.-C. network with independent current supply, the generator maintaining the engine speed constant while the driving energy delivered to the engine varies with the difference between the available fluid pressure and the pressure level demanded by the consumer served by the pipeline, as well as with the flowing gas quantity.

In accordance with a feature of this invention I utilize for the heating of the transmitted gas, prior to expansion, a combustible mixture of the same gas and air both delivered under elevated pressure to a suitable heater. Thus, the fuel component of the mixture may be taken from the pipeline either ahead of the fluid-driven engine or ahead of its final stage in the case of, for example, a multistage gas turbine. The combustion air is compressed simultaneously to a similar level whereupon the mixture is burned to heat the remainder of the transmitted gas. Such heating can be carried out either directly or indirectly; in the first case the hot combustion gases are admixed with the gas to be heated, this being the preferred mode whenever a dilution of the gas to lower its calorific value is desirable or at least permissible, whereas in the second case the high pressure gas to be expanded is led past suitable surfaces of good thermal conductivity forming part of a conventional heat exchanger. In each case, according to a further feature of my invention, the residual pressure of the combustion gases is converted into useful energy; with direct heating this residual pressure becomes effective in the expansion engine whereas with indirect heating such pressure is available to drive a load, preferably the air compressor itself.

The above and other objects, features and advantages of the present invention will become more fully apparent from the following detailed description, reference being made to the accompanying drawing in which.

Figure 1:
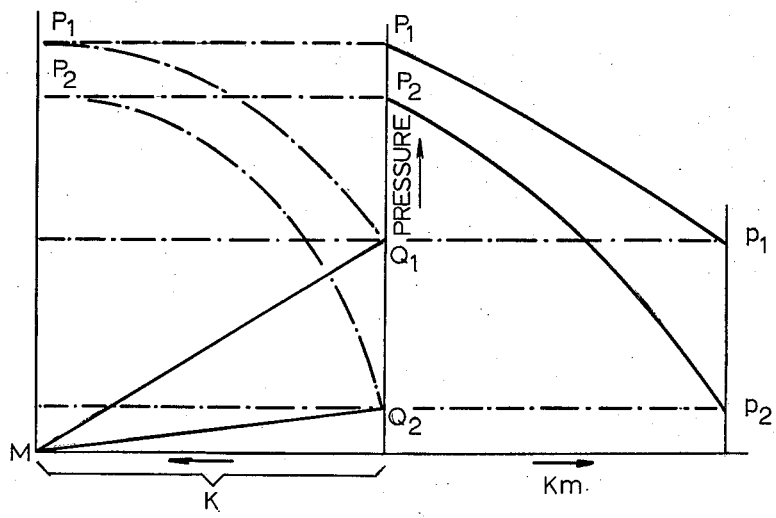
FIG. 1 is a graphic representation of the relationship between two sets of correlated pressures at the beginning and the end of a pipeline.

In identical pipes of the same length, delivering fluid at the same rate of flow, the relationship between the pressures at their respective ends can be expressed as $$(P_1^2 - p_1^2) = (P_2^2 - p_2^2) = K^2 \qquad (1)$$

where $P_1$ is the pressure at the entrance to the high-pressure pipe, $P_2$ is the pressure at the entrance to the low-pressure pipe, $p_1$ is the pressure at the exit from the high-pressure pipe, and $p_2$ is the pressure at the exit from the low-pressure pipe;

as can be seen from FIG. 1, a small increase in the initial pressure in a pipe produces a large increase in the terminal pressure.

The work required for isothermic compression of the fluid at the beginning of a section of the pipeline is proportional to $$\log_n \frac{p_1}{p_2}$$

and likewise the work available from isothermic expansion of the fluid at the end of the line is proportional to $$\log_n \frac{p_1}{p_2}$$

From FIG. 1 it can be seen that the fraction $$\frac{p_1}{p_2}$$

is far greater than the fraction $$\frac{P_1}{P_2}$$

Therefore the energy available from the fluid at the terminus of a section is greater than the energy required for the compression of the fluid at the beginning of the section.

When preheating is used in the decompression section of the system, the heat delivered to the compressed fluid is recovered in the expansion with very high efficiency.

With isothermic compression and expansion at opposite ends of a line, the work available at the output end that is in excess of that required for the initial compression arises from the decreased specific flow resistance in the line (wherein the expansion occurs also isothermically) which in turn results from the lower specific volume occupied by gas in the pipe and the slower rate at which it travels from one end to the other. The work thus realized is proportional to $$\log_n \frac{P_2}{p_2} - \log_n \frac{P_1}{p_1} \quad (2)$$

which is equal to $$\log_n \frac{p_1}{p_2} - \log_n \frac{P_1}{P_2} \quad (3)$$

hence the net useful energy realized is proportional to the difference between the work obtained by isothermic expansion of the fluid and the work required for its isothermic compression.

This system has the additional advantage of increasing the storage capacity of the pipeline which permits its initial design for rated or average load rather than for maximum load, with a consequent saving in initial pipeline cost. Such design for rated load is permissible because the storage capacity automatically compensates for load variations at the expense, of course, of energy available at the expansion installation. The storage capacity also provides a built-in reliability feature to reduce or eliminate intermittency in delivery.

These advantages can be shown by the following analysis. The increased storage capacity, which is proportional to the difference of the cubes of the initial and the terminal pressures in the pipeline segment under consideration, can be expressed as $$D^2 L[(P_1^3 - p_1^3) - (P_2^3 - p_2^3)] \quad (4)$$

where:

$L$=length of the pipeline section,
$D$=inner diameter of the pipe,
$P_1$=relatively elevated pressure at beginning of the section, $p_1$=relatively elevated pressure at terminus of the section,
$P_2$=minimum pressure at beginning of the section, and
$p_2$=minimum pressure at terminus of the section.

FIG. 1 also illustrates how, given three of the above terminal pressures such as $P_1$, $P_2$ and $p_2$, one can graphically determine the fourth ($p_1$). Let $Q_2$ be a point on an arc of radius $P_2$, centered on M, whose co-ordinates are K, $p_2$; intersect the ordinate through $Q_2$ with an arc of radius $P_1$, also centered on M, to find the point $Q_1$ (K, $p_1$). It will be seen that the relationship of equation 1, $P_1^2 - p_1^2 = P_2^2 - p_2^2 = K^2$, is satisfied. It will also be noted that, for a line of given length L, the slope of curve $P_2$, $p_2$ is considerably steeper than that of the curve $P_1$, $p_1$.

The following numerical example illustrates concretely the advantages of operating a pipeline at elevated pressure.

Delivery rate of fluid (consisting mainly of methane):

$q$=20,000 m.³/hr. STP (cubic meters per hour at standard temperature and pressure)
$L$=200 km.
$D$=25 cm.
$P_1$=50 kg./cm.² (optimum maintainable input pressure)
$p_2$=1.5 kg./cm.² (pressure required by consumer);

whence, by calculation:

$P_2$=33 kg./cm.² (input pressure normally required to realize $p_2$) and
$p_1$=37.5 kg./cm.² (output pressure available with input pressure $P_1$)

with a resulting decompression ratio $$\frac{p_1}{p_2} = \frac{37.5}{1.5} = 25$$

an expansion turbine at the terminus of a section could theoretically produce by isothermic expansion 1750 kw. With the efficiency of the expansion stage equal to 80% or better, 1400 kw. or more are available for useful work.

The corresponding compression ratio $$\frac{p_1}{p_2}$$

at the beginning of the pipeline segment is $$\frac{50}{37.5} = 1.34$$

With isothermic compression and 80% efficiency, the work required in the compression stage of the system is 200 kw.

The excess energy thus available at the expansion stage of the system is 1200 kw. This value must, of course, be modified by taking into account the amount of thermal energy invested at the expansion end less the heat gain (if any) at the compression end of the line. Again, the heat required for isothermic decompression is but a fraction of the total energy involved, hence the work recoverable by expansion at the output end substantially exceeds the work required for compression at the input and also under polytropic or adiabatic conditions. The ready availability of a convenient heat source (methane) enables, however, an economical preheating of the gas so as to raise the yield of the kinetic energy above the level obtainable with isothermic expansion.

Using the value given above for the work calculations, and substituting them in equation 4, one finds that there are 220,000 m.³ STP of gas available to compensate for transient consumption fluctuations and to serve as a reliability factor.

Figure 2:
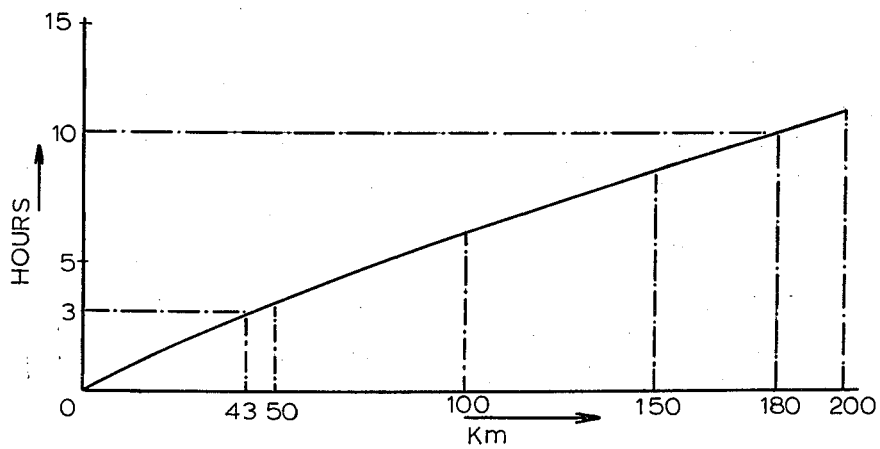
FIG. 2 is a graph of the duration of continued uninterrupted flow after a line shut-down as a function of the distance between the consumer and the shut-down.

If a section of the line were to be shut down for repair, this quantity of gas would supply up to eleven hours of uninterrupted gas service under normal consumption conditions, at pressure $p_2$, at a distance of 0 to 200 km. from the cut-off point. FIG. 2 shows the variation in uninterrupted-service time as a function of the distance from the location of the shut-down.

Under the assumption that the probability of a shut-down is the same at all points along a pipeline section, the theory of probability can be used to calculate the length of a time a consumer would ordinarily be without a gas supply during the year. This calculation, based upon observation of modern cathodically protected pipelines, has been published in Vol. XXVII of Acta Technica Hungarica (1959).

Figure 3:
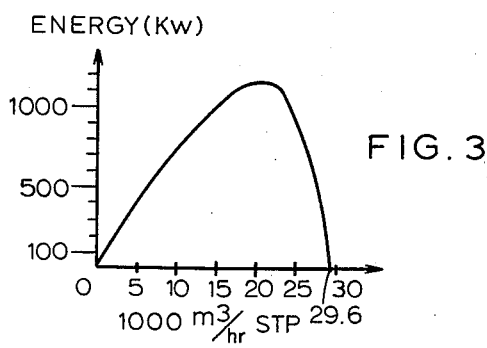
FIG. 3 is a representation of the energy available with different rates of flow at a terminus of the final section of a pipeline.

The difference between the energy available at the expansion station of the system and the energy required to supply the elevated pressure is shown in FIG. 3 as a function of the quantity of gas supplied per hour. The curve peaks at approximately 20,000 m.$^3$/hr. STP and does not begin to fall off rapidly until it reaches a value close to 30,000 m.$^3$/hr. This latter figure in the example under discussion represents the maximum flow rate that would yield surplus energy at the expansion stage.

The system described above, designed for a rated delivery of approximately 20,000 m.$^3$/hr. STP with an output pressure of 1.5 kg./cm.$^2$, will supply a maximum steady gas flow of 30,000 m.$^3$/hr. if the rate of expansion and, therefore, the recovery of kinetic energy at the output end of the line is reduced to zero. The output pressure under these conditions would be approximately 5 kg./cm.$^2$. This mode of operation leaves still untapped the surplus of 220,000 m.$^3$ stored in the line. It is, therefore, possible to supply an intermittent demand of as many as 50,000 m.$^3$/hr., i.e. an excess of 20,000 m.$^3$/hr. over the steady-state maximum, for a period of 11 hours. If an augmented input pressure in accordance with this invention were not used, it would be necessary to design the pipeline for this peak load by enlarging the inner pipe diameter to 30 cm. This would increase the weight of the pipeline by 35% and correspondingly add to the initial investment required.

Figure 4:
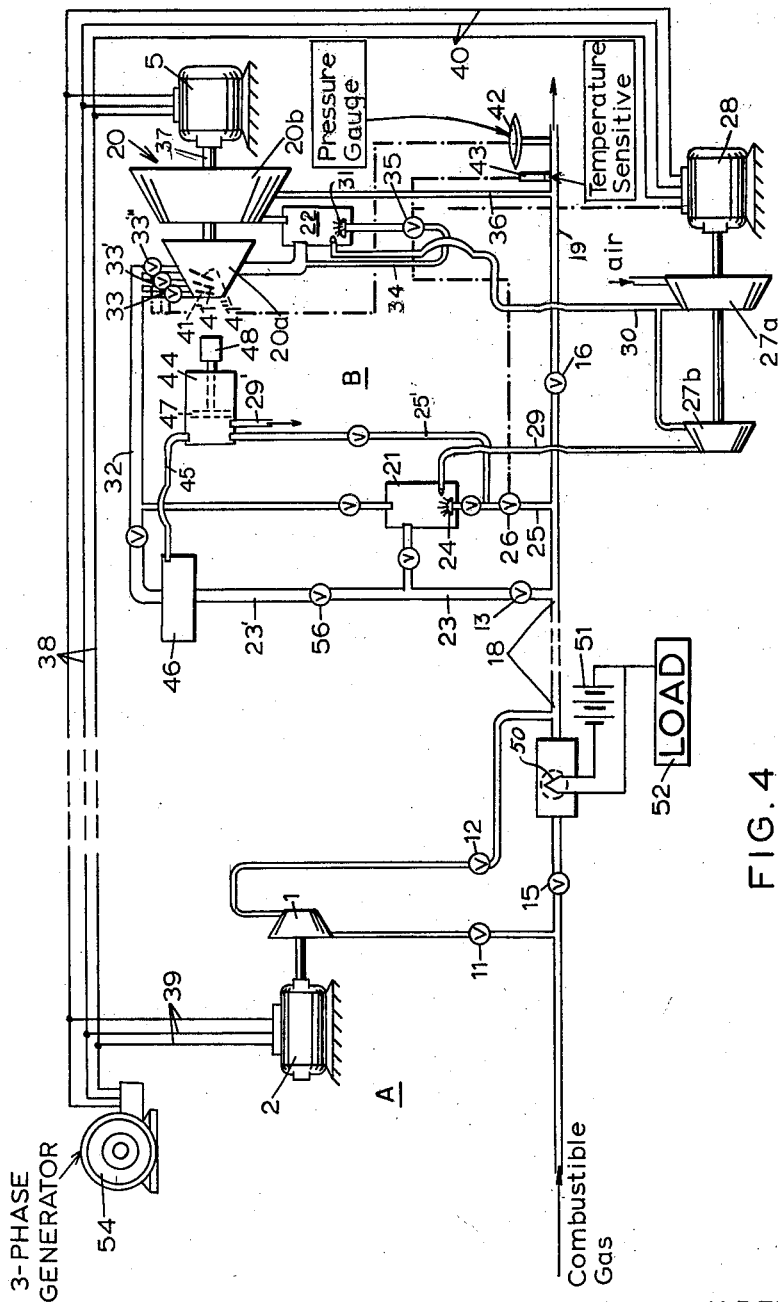
FIG. 4 is a diagram of the pipeline section incorporating the present invention.

FIG. 4 schematically illustrates one embodiment of the present invention. The compressor station is designated by A and the expansion station by B.

At A, a compressor 1 is driven by an electric motor 2. Valves 11, 12 and 15 permit the compressor station A to be cut in and out of the pipeline 18. When the compressor 1 is functioning, valve 15 is closed and the gas enters the compressor at the pressure $P_2$. The gas leaves the compressor 1 through valve 12 at pressure $P_1$ and proceeds through pipe 18 to the expansion section B. An optional installation for the recovery of generated compression heat is shown to comprise a thermocouple 50, positioned in line 18 just beyond valve 12, which supplies a storage battery 51 connected across a load 52.

The expansion station B comprises primarily a two-stage turbine 20, whose stages 20a, 20b are respectively preceded by a pair of direct heaters 21, 22. A valve 16, which is closed unless the arriving gas from pipeline 18 is to be delivered without preliminary expansion (e.g. for the purpose of drawing upon the stored quantity during peak periods) to a service line 19 leading to the consumer network, is inserted between these two conduits and in its open condition bypasses the turbine 20. Ahead of bypass valve 16 a conduit 23 with a shut-off valve 13 branches off to deliver the major portion of the oncoming gas to heater 21 at a location beyond the burner 24 thereof, this burner receiving a minor portion of the gas through another branch conduit 25 provided with a control valve 26. Atmospheric air is concurrently delivered to burner 24 within heater 21, at a pressure substantially matching that of the gas from conduit 25, via a conduit 29 from a two-stage compressor 27a, 27b driven by a reaction motor 28. Part of this air, at lesser pressure, is branched off from the first compressor stage 27a by way of a conduit 30 terminating at the burner 31 of heater 22. The hot combustion gases from heater 21 still under pressure and mixed with the unburned gas admitted into the heater chamber through conduit 23, pass into the first turbine stage 20a via a conduit 32 and a set of partial-admission valves 33, 33', 33''; the bulk of the partly expanded gas emerging from that stage enters the top of heater 22 while a small fraction thereof is admitted, through a branch conduit 34 with regulating valve 35, to this heater at its burner 31 for further combustion. The final mixture available in the upper part of the chamber of heater 22, still under a pressure greater than that required in the service line 19, drives the second turbine stage 20b before entering the service line via a conduit 36. Valve 13 is closed manually or by suitable control means, not shown, concurrently with the opening of valve 16, when no surplus pressure is available at station B.

The mechanical output of turbine 20a, 20b, i.e. the torque of its shaft 37, drives a synchronous generator 5 which feeds a three-phase network 38 energized by alternating current from a polyphase source 54. Generator 5 is locked in with the frequency (e.g. 60 c.p.s.) of source 54 by network 38 to which it delivers current when the turbine 20, whose speed is held constant by the generator, abstracts energy from the gas flow. A pair of branch lines 39, 40 are shown to extend from the network 38 to the compressor motor 2 at station A and to the compressor motor 28 at station B, respectively.

The turbine 20, or at least its high-pressure stage 20a, is conventionally divided into a plurality of sections axially spaced along shaft 37, these sections including the usual rings of rotating impeller vanes which co-operate with respective rings of stationary guide blades and whose pitch decreases progressively from one section to the next as illustrated diagrammatically with respect to three such vanes 41, 41', 41''. The valves 33, 33', 33'', in a manner known per se, control the admission of gas from conduit 32 to the several sections 41, 41', 41'' in dependence upon the rate of expansion required at station B, this rate being determined by a pressure sensor 42 connected to line 19. A thermometric device 43, connected to the same line, determines the rate of combustion at burners 21 and 22, with a view to maintaining the gas temperature in line 19 substantially at ambient level, by controlling the valves 26 and 35 as well as the speed of motor 28.

FIG. 4 also illustrates the use of the invention in conjunction with internal-combustion engines. An extension 25' of branch pipe 25 leads to a piston cylinder 44 which also serves as a combustion chamber; another conduit 45 connects cylinder 44 with a mixing chamber 46 which receives gas from the main line 18 through an extension 23' of conduit 23. Cylinder 44 also draws atmospheric air through a port 29'. This air, upon being densified by the compression stroke of the reciprocating piston 47 in cylinder 44, is mixed with high-pressure pipeline gas from conduit 25' at the end of that stroke under the control of a conventional valve system not illustrated; the mixture is then ignited, e.g. with the aid of the usual spark plug, to bring about the working stroke of the piston. In the subsequent exhaust stroke the waste gases, having yielded energy at least sufficient to compensate for the work of air compression, are discharged via line 45 into chamber 46, whereupon during the following suction stroke fresh air enters the cylinder via port 29'. The gas from branch 23', heated by the admixed exhaust gases in chamber 46, then is fed to turbine stage 20a by means of pipe 32. Piston 47 drives a load generally designated 48.

A series of valves 56, not described in detail, serve to switch over from heater 21 to cylinder 44 or vice versa. Either mode of operation results in a highly efficient heating of the pipeline gas at the expense of some reduction of its calorific value.

Figure 5:
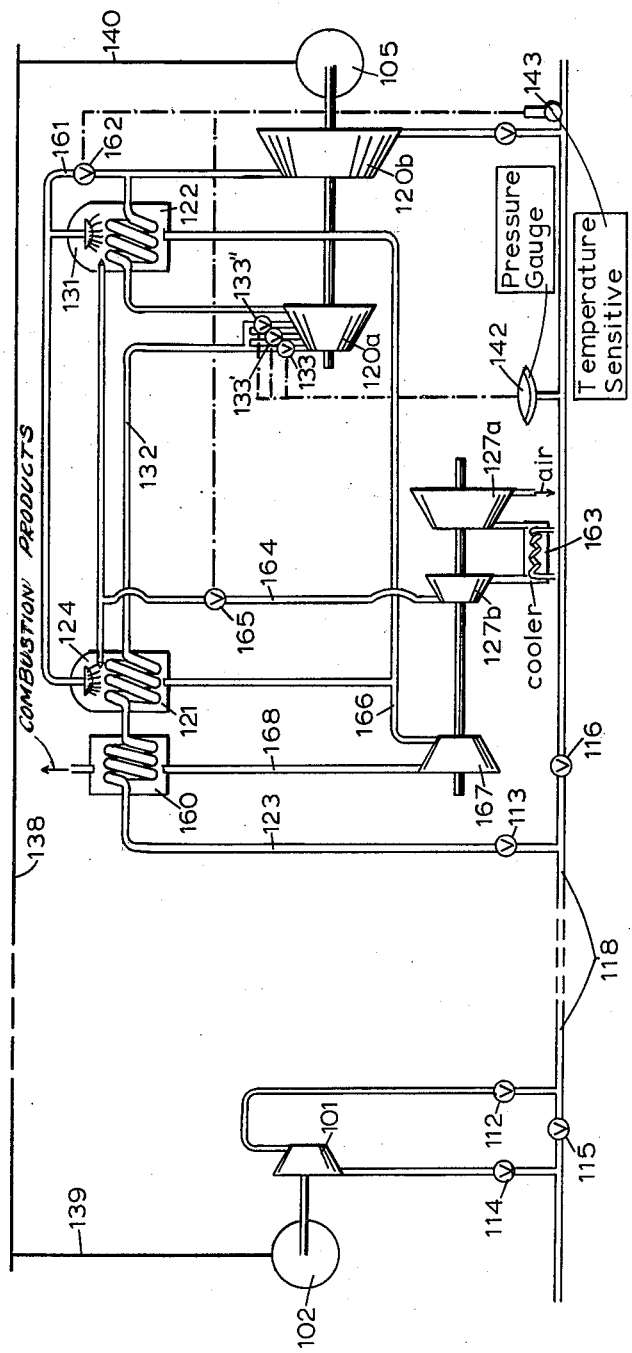
FIG. 5 is a diagram similar to that of FIG. 4, showing a modification.

In FIG. 5 I have shown a system in which elements analogous to those of FIG. 4, though illustrated more schematically in some instances, have been designated by the same reference numerals with the addition of a "1" in the position of the hundreds digit.

High-pressure pipeline gas from conduit 123, having traversed the valve 113, passes through a preheater 160 and then through a first indirect-heating stage 121 whence it enters conduit 132 leading via partial-admission valves 133, 133', 133" to the high-pressure turbine stage 120a. The partly expanded gas from that stage flows through a second indirect heater 122 into the low-pressure turbine stage 120b while a fraction thereof is branched off at a conduit 161, including a valve 162 to feed the burners 124 and 131 of heaters 121, 122. Air from a compressor 127a, 127b, which also comprises an interstage cooler 163, arrives via a conduit 164 with control valve 165 at the burners 124, 131 under a pressure similar to that of the gas from line 161. The combustion gases from heaters 121 and 122, also under pressure, merge in a duct 166 to drive a turbine 167 which powers the air compressor 127a, 127b. The hot but substantially fully expanded exhaust gases of turbine 167 are discharged through a conduit 168 and preheater 160 to serve as a heating fluid for the latter. Pressure sensor 142 again controls the partial-admission valves 133, 133', 133", while the valves 162 and 165, which determine the combustion rate of heaters 121 and 122, are adjusted by the thermometric device 143 to maintain the desired temperature level.

In a practical system the pressure of the gas arriving at the input end of pipeline section 118 and passing through valve 114 to compressor 101 is assumed to be 42.5 atmospheric gauge; this pressure is increased by the compressor, driven by motor 102, to 60 atmospheres at valve 112 and drops again to 42.5 atmospheres upon arrival of the gas at valves 113 (open) and 116 (closed) after passing through the line. The air delivered by compressor stage 127b has a gauge pressure of 7 atmospheres, whereas the expanded gas leaving turbine stage 120b has dropped to 1.5 atmospheres gauge.

The principal advantage of feeding a combustible mixture to the burners 124, 131 of indirect heaters 121, 122 at high pressure is that the rate of heat transfer across the thermally conductive walls of the conduits carrying the pipeline gas within these heaters will be substantially increased thereby. Thus, the heat-transmission coefficient at the interface between conduit and fluid, i.e. at both the inner and the outer conduit surface, varies with good approximation as the $0.8^{\text{th}}$ power of fluid density. If, for example, the density of the combustion gases within the heater were increased sixfold, the heat-transmission coefficient at that interface would rise to about 4.2 times its original value; similar considerations apply to the interior of the conduit where the pipeline gas passes under high pressure and, therefore, at great density. Altogether, the heat-transfer rate may be increased by as much as a factor of 3.5. This thermal advantage, in turn, enables a considerable reduction in the dimensions of the heater surfaces and other parts of the installation.

In some instances it may be desirable to allow the expanded gas to reach a temperature less than the ambient level. Furthermore, as will be noted from the foregoing disclosure, various types of expansion machines (including gas turbines and internal-combustion engines) may be utilized in the practice of my invention along with different forms of direct or indirect heating means; also, more or less than two heating or expansion stages may be employed with obvious modifications of the systems described and illustrated. These and other departures from the precise embodiments herein disclosed, including combinations of compatible features shown in different figures of the drawing, will be readily apparent to persons skilled in the art and are intended to be embraced in the spirit and scope of the invention as defined in the appended claims.

I claim:

1. A method of conveying a combustible gas through a pipeline section for arrival with a predetermined output pressure at the exit end of said section, comprising the steps of compressing said gas under an elevated pressure substantially greater than the input pressure required at the entrance end of said section for obtaining said output pressure, introducing the gas at said elevated pressure into said section at said entrance end, recovering said gas at said exit end with a resultant pressure substantially exceeding said output pressure, heating at least a part of said gas at said exit end to an elevated temperature by burning a portion of said gas under pressure in the presence of air under pressure and communicating the resulting combustion heat to the remainder of said gas, expanding the gas so heated for establishing said output pressure in the recovered fluid with resultant cooling to a level substantially equal to at most its original exit temperature, and converting the work of expansion available at said exit end into useful energy.

2. A method according to claim 1 wherein said remainder is heated by admixture with the hot combustion gases under pressure resulting from the burning of said portion with said air.

3. A method according to claim 2 wherein the expansion of the heated gas is carried out in successive stages and combustion gases of progressively lower pressure are admixed with the gas to be heated in advance of successive expansions.

4. A method according to claim 2 wherein combustion is carried out at successive stages, the gas burned in a subsequent combustion being taken from the output of a preceding expansion stage.

5. A method according to claim 4 wherein the air for the successive combustion stages is mixed under progressively lower pressures with the gas to be burned at said combustion stages.

6. A method according to claim 1 wherein said remainder is indirectly heated through an intervening thermally conductive wall exposed on one side to the gas to be heated and on the other side to the hot combustion gases under pressure resulting from the admixture of said portion with said air.

7. A system for conveying a combustible gas from a first location to a second location, comprising a pipeline section interconnecting said locations, compressor means at said first location for delivering said gas to said section at an elevated pressure substantially greater than an input pressure corresponding to a predetermined output pressure required by a consumer at said second location, expansion means at said second location connected to said section for receiving therefrom at least part of said gas at a resultant pressure substantially exceeding said output pressure and reducing the overall pressure of the gas delivered to said consumer to said output pressure, heating means at said second location for raising the temperature of said gas prior to expansion in a manner at least partly compensating for the subsequent cooling of the expanding gas, said heating means including a combustion chamber, a source of air under pressure and first and second conduit means for respectively delivering compressed air from said source and compressed gas from said pipeline section to said chamber for combustion therein, and a load powered by said expansion means for utilizing at least a substantial part of the energy of expansion from said resultant pressure to said output pressure.

8. A system according to claim 7 wherein said expansion means comprises a piston engine, said combustion chamber being a cylinder for the piston of said engine.

9. A system according to claim 7 wherein said combustion chamber is provided with burner means directly connected with said second conduit means for receiving a relatively small portion of said gas from said pipeline section.

10. A system according to claim 9 wherein said heating means further comprises third conduit means for delivering a relatively large portion of said gas from said pipeline section to said chamber at a location beyond said burner means for direct admixture with the combustion gases therein, said chamber communicating with said expansion means for delivering the resulting mixture of high-pressure gases thereto.

11. A system according to claim 9, further comprising thermometric means at said second location beyond said expansion means for detecting the temperature of the expanded gas, and pressure-control means at least at one of said conduit means connected to said thermometric means for varying the rate of combustion in a manner maintaining the last-mentioned temperature substantially constant.

12. A system according to claim 11 wherein said pressure-control means is also connected with said source for varying the delivery rate thereof.

13. A system according to claim 9 wherein said heating means further comprises thermally conductive duct means for leading a relatively large portion of said gas from said pipeline section through said chamber in heat-exchanging relationship with the combustion gases therein, said duct means communicating with said expansion means for delivering the heated high-pressure gases thereto.

14. A system according to claim 13 wherein said source comprises an air compressor provided with drive means therefor, said chamber communicating with said drive means for powering the latter with said combustion gases.

15. A system according to claim 14, further comprising preheater means for said relatively large portion ahead of said heating means, said preheater means being connected with said drive means for receiving the spent combustion gases therefrom and communicating their residual heat to the gas to be preheated.

16. A system according to claim 13 wherein said second conduit means is connected to the output end of said expansion means for delivering a small fraction of the expanded gas to said burner means.

17. A system for conveying a combustible gas from a first location to a second location, comprising a pipeline section interconnecting said locations, compressor means at said first location for delivering said gas to said section at an elevated pressure substantially greater than an input pressure corresponding to a predetermined output pressure required by a consumer at said location, multistage expansion means at said second location connected to said section for receiving therefrom at least part of said gas at a resultant pressure substantially exceeding said output pressure and reducing the overall pressure of the gas delivered to said consumer to said output pressure, multistage heating means at said second location for raising the temperature of said gas prior to successive expansions in a manner substantially compensating for the subsequent cooling of the expanding gas, each stage of said heating means including a combustion chamber, a source of air under pressure and first and second conduit means for respectively delivering compressed air from said source and compressed gas from said pipeline section to said chamber for combustion therein, the sources of air under pressure of successive stages of said heating means being respective stages of progressively lower pressure of a multistage air compressor, and a load powered by said expansion means for utilizing at least a substantial part of the energy of expansion from said resultant pressure to said output pressure.

18. A system according to claim 17 wherein said second conduit means of a subsequent stage of said heating means is connected to the output end of a preceding stage of said expansion means for delivering part of the output of the latter to the combustion chamber of said subsequent stage.

References Cited in the file of this patent
UNITED STATES PATENTS

| | | |
|---|---|---|
| 2,231,500 | Harlow | Feb. 11, 1941 |
| 2,734,447 | Kurek | Feb. 14, 1956 |